W. SCHÄFER.
RELEASING MECHANISM FOR BORING TOOLS.
APPLICATION FILED DEC. 17, 1909.

1,037,799.

Patented Sept. 3, 1912.

Witnesses:

Inventor
Wilhelm Schäfer
per Attorney.

UNITED STATES PATENT OFFICE.

WILHELM SCHÄFER, OF COLOGNE, GERMANY.

RELEASING MECHANISM FOR BORING-TOOLS 1,037,799.　　　　　Specification of Letters Patent.　　Patented Sept. 3, 1912.

Application filed December 17, 1909. Serial No. 533,660.

*To all whom it may concern:*

Be it known that I, WILHELM SCHÄFER, a subject of the Emperor of Germany, residing at Gabelsbergerstrasse 23, Cologne-on-the-Rhine, Germany, have invented a new and useful Improvement in Releasing Mechanism for Boring-Tools, of which the following is a specification.

This invention relates to an improvement in releasing devices for tools or implements inserted in boring spindles. These tools were formerly provided with tangs of angular tapering form adapted to engage in a like shaped recess in the spindle itself. This construction has been found to involve rapid wear and soon to become unserviceable. In order to remedy the drawbacks of this construction, it has been proposed to fit an axially adjustable cap so as to engage over the flat sided tang of the tool, but such a cap as hitherto used causes difficulty when it is desired to release the tool from the spindle.

The present invention consists in providing a means for instantaneously releasing the tang of the boring tool from the spindle and comprises a revoluble cam shaft journaled in the bore spindle transversely to the spindle axis, and cams on said shaft adapted to press down the cap when the cam shaft is rotated and thereby push the tool out of the bore spindle.

Figure 1:
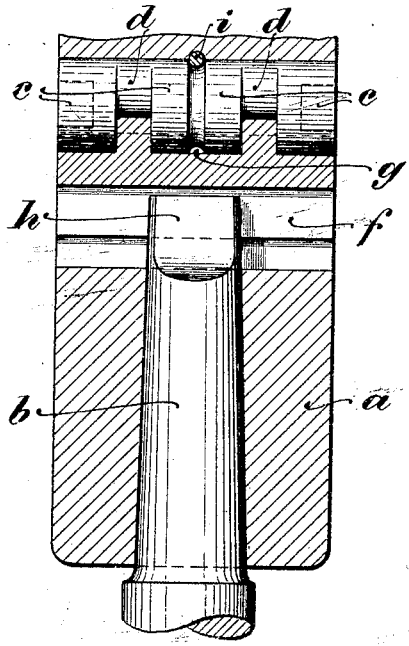
Figure 2:
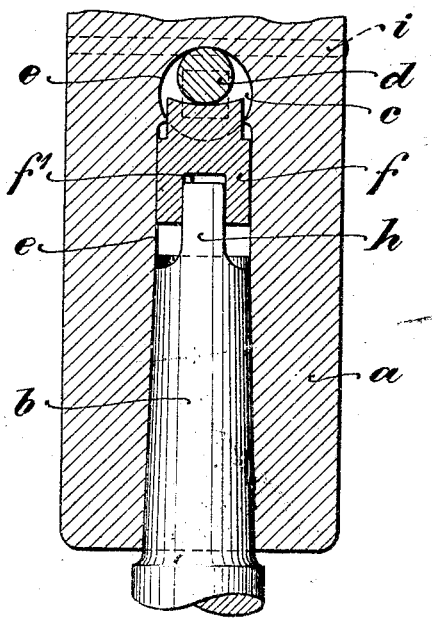

The invention is illustrated in the accompanying drawing in Figures 1 and 2 in longitudinal section taken at right angles, the one to the other. The opening $e$ formed in the bore spindle $a$ serves to receive the cam shaft $c$, $d$ and the cap $f$. The cap $f$ engages with its recess $f'$ over the quadrangular tang $h$ of the tool $b$ making an absolutely secure connection therewith even if the end of the tool has become shortened in consequence of long use.

In order to prevent the cam shaft from moving out transversely from the bore spindle, it is provided with an annular groove $g$ in which a pin $i$ passing through the bore spindle, can engage. Parts $d$ between the cams $c$ of the cam shaft $c$ $d$ engage corresponding extensions on the cap $f$ so that this also is held from moving transversely. The two heads of the cam shaft $c$ $d$ possess quadrangular apertures for the engagement of a screw key.

The action of the apparatus is as follows: When a screw key is inserted in one of the quadrangular holes of the cam shaft $c$ $d$ and turned a little to the right or left, the cam shaft $c$ $d$ presses down the cap $f$, and the latter in turn depresses the tang $h$ of the tool $b$, effecting the immediate release of the tool from the bore spindle.

What I claim is:

A device for releasing a boring tool from the spindle or holder comprising in combination a transverse revoluble shaft, means for retaining said shaft from transverse movement in the spindle, a transverse cap axially guided in said spindle and recessed to engage the tang of the bore tool, collars on said cap engaging with said transverse shaft to prevent transverse movement of the cap, and cams on said transverse shaft engaging with said cap and adapted to force it axially outward when said cam shaft is rotated, for the purpose of releasing the bore tool from the spindle.

In testimony whereof I have signed my name to the specification in the presence of two subscribing witnesses.

WILHELM SCHÄFER.

Witnesses:
　LOUIS VANDORY,
　GERTRUD BONA.